March 24, 1936.    J. M. MILLER    2,034,917

CONICAL REEL SIDE PLATE

Filed Feb. 18, 1935

INVENTOR.
John M. Miller
BY
James Harrison Bowen
ATTORNEY.

Patented Mar. 24, 1936

2,034,917

UNITED STATES PATENT OFFICE 2,034,917

CONICAL REEL SIDE PLATE

John M. Miller, Bloomfield, N. J.

Application February 18, 1935, Serial No. 7,127

15 Claims. (Cl. 242—84.1)

The purpose of this invention is to improve casting with fishing rods by making it possible for the line to pass off of the end of the reel without turning the reel spool lengthwise of the rod.

The invention is a reel having a side plate with a conical extension and a slot in the upper surface of the extension through which the line may readily be placed for casting, and which is so arranged that the line will be drawn off of the end of the reel and will pass out of the end of said conical side plate.

In casting, the reel spool is generally released so that it will spin around as the line leaves the spool, however it will be appreciated that there is a slight degree of friction, as any absolutely free running spool will unwind faster when the line leaves the spool, so that it is impossible to make an absolutely free cast with the spool being unwound by the line. Other fishing lines have been provided in which the spool, or drum, turns lengthwise of the rod, however these require special pivot joints, and means for holding the joints.

The object of the invention is, therefore, to provide a fishing reel in which the line may be drawn off of the end of the spool without unwinding the spool, and in which it is not necessary to turn the reel.

Another object is to provide means at the side of a fishing reel which may be made in combination with the reel, and by which a fishing line may be drawn off of the end of the reel.

Another object is to provide a fishing reel in which the line may be drawn outward toward one side which is so arranged that the line may also extend directly outward from the spool.

Another object is to provide a fishing reel with an extension having a slot therein forming the side plate, and in which the line may readily be passed through the slot or removed therefrom.

A further object is to provide a fishing reel having a conical shaped extension at one side in which the line may be placed through the openings therein in which the openings are so positioned that it is practically impossible for the line to work out.

And a further object is to provide a fishing reel in which the line may be drawn off of the end of the reel for casting which is of a simple and economical construction.

With these ends in view, the invention embodies a fishing reel in which one of the side plates is formed of a conical shaped outwardly extending extension having an eccentrically positioned slot in the upper surface thereof, and in which the line may be placed so that it will not be drawn directly across the slot. The invention also embodies a cam brake bearing against the end of the spool and a ratchet positioned to automatically hold with greater force on the outgoing line than on the incoming line.

Other features and advantages of the invention will appear from the following description, taken in connection with the drawing, wherein.

Figure 1:
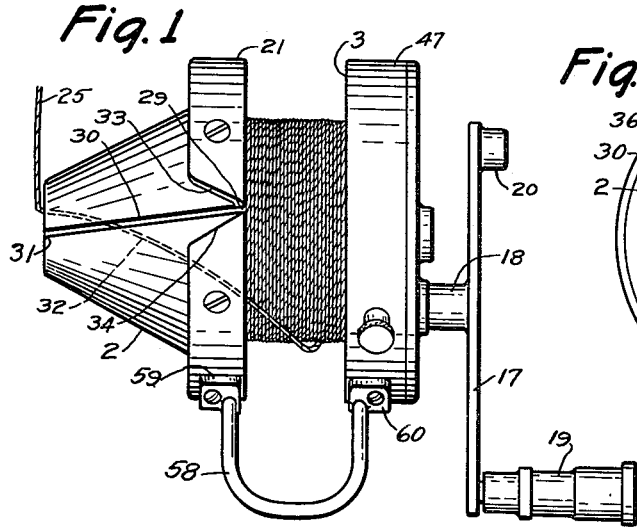
Figure 1 is a plan view of the reel.

In the drawing the reel is shown as it may be made wherein numeral 1 indicates the spool, numeral 2 the special conical side plate, and numeral 3 the side plate on the opposite side in which the operating mechanism is embodied.

The spool 1 may be of any type or design, and may be held or mounted in any manner. In the drawing the spool is shown freely rotatable on a sleeve 4 extending inward from the side plate 3, and the spool is held to the end of a shaft 5 by a cup shaped washer 6, the edges of which are soldered or welded to the spool and this is formed with a square opening which fits over the square end of the shaft 5 and is held by a screw 7. The opposite end of the shaft 5 is provided with a shoulder 8, and a relatively smaller end 9 thereof extends into a bearing 10 in a cover plate 11 on the outside of the plate 3. A gear 12 is rigidly mounted on the part 9 of the shaft 5 and this gear meshes with another gear 13 on a shaft 14 which is rotatably held in a bearing 15 of the plate 3, and also in a bearing 16 of the plate 11. The handle by which the reel is operated is mounted on the outer end of the shaft 14 and the handle is formed by a bar 17 with a hub 18 that is mounted on the end of the shaft 14, and at one end of the bar 17 is a knob 19 by which it may be gripped and held by the hand, while at the opposite end is a small balancing member 20, as shown in Figure 1. It will be noted that as the handle is rotated it will turn the gear 13, and this will in turn turn the gear 12, and thereby wind the spool 1.

Figure 3:
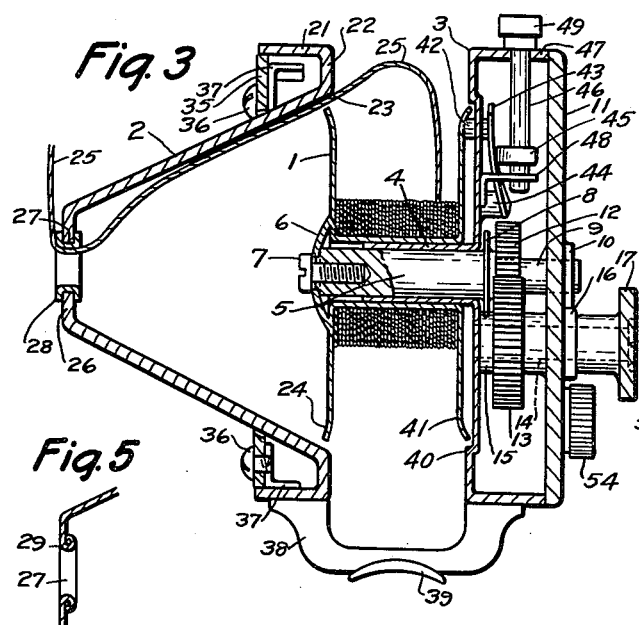
Figure 3 is a longitudinal section through the reel.
Figure 5:
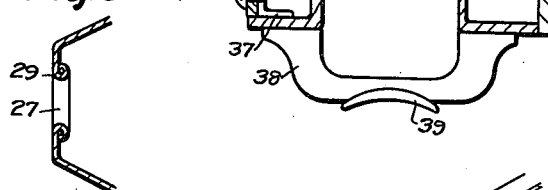
Figure 5 is a detail showing an alternate method of providing a lip around the inner edge of the opening in the end of the conical shaped side.

The side plate 2 is formed with an inner circular flange 21, a straight section 22, and the conical section extends outward therefrom leaving a slight clearance 23 between the outer edge of a flange 24 on the side of the spool 1 so that the line, as indicated by the numeral 25, may pass through the space between the outer edge of the flange 24 and the inner surface of the conical member. At the outer end of the conical member is a web 26 having an opening 27 in the center thereof, and this opening may be provided with a bushing or eyelet 28, as shown in Figure 3, or the edges of the member 2 around the opening 27 may be rolled, as shown at the point 29 in Figure 5. This bushing 28 may be omitted, as the reel may be used without any member whatever in the opening 27, or any means may be used for providing a relatively smooth edge over which the line may pass.

Figure 2:
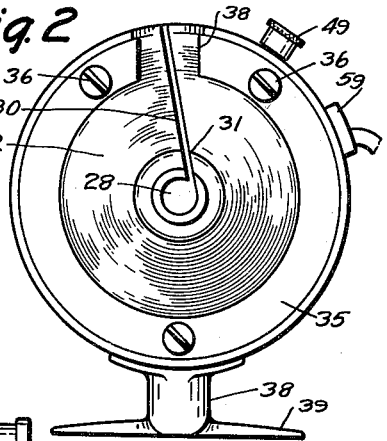
Figure 2 is an end view looking toward the conical shaped side.

The member 2 is provided with a slot which extends from a point 29 in the top thereof downward through the member 22 and out through the conical member 2 on a slight angle, as indicated in Figure 1 in which the slot is indicated by the numeral 30. This slot extends from a point 29 which is on one side of the center of the reel to a point 31 on the opposite side of the center at the outer end of the member 2, and then downward through the section 26 to the periphery of the opening 27, as shown in Figure 2. With the slot arranged in this manner, it is practically impossible for the line to jump out of the slot as it is passing outward from the spool, as the tendency for the line will be to cross the slot, as shown by the dotted lines 32 in Figure 1, because as it unwinds from the spool and passes out of the opening 27 it will start from the rear side of the spool and pass out of the forward side of the opening 27, whereas if the slot were positioned in the center the line would have a tendency to jump out. The flange 21 may be cut away as shown at the points 33 and 34 in Figure 1, so that the line may be readily fed through the slot, and also readily removed therefrom. The outer edge of the flange 21 may be provided with a closure ring 35 which may be held to the member 2 by screws 36 in clips 37, as shown in Figure 3. It will be understood, however, that the outer edge of the member 2 may be formed in any manner, and any means may be used for closing the opening at the edge thereof instead of the ring 35. The ring 35 is also provided with a slot 38, the edges of which correspond with the outer edges of the bevel sections 33 and 34 of the member 21.

The conical side plate 2 is mounted upon a base member 38 which has a curved plate 39 that may be clamped to a fishing rod, and the side 3 is attached to the opposite side of the base 38. The side 3 is provided with a recess 40 to accommodate the edge of the side plate 41 of the spool 1, and it will be noted that this plate is free to rotate in the recess.

The device is provided with a brake consisting of a lug 42 on a spring member 43 which is attached to the plate 3 through a post 44, and this is held inward by a cam 45 on a pin 46 which is rotatably held in a flange 47 of the member 3, and also in a clip 48 attached to the member 3. The outer end of the pin 46 is provided with a head 49 by which it may be rotated to turn the cam 45, and it will be noted that the position in this cam may be adjusted to obtain any amount of friction desired on the side plate 41 of the spool 1.

Figure 4:
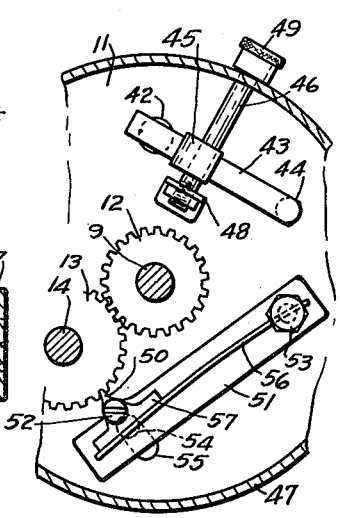
Figure 4 is a sectional detail with parts omitted showing the brake and ratchet.

It will be noted that in the design shown in Figure 4 the brake is located on the opposite side, and therefore it will be understood that the brake may be located on either side, or in any position that may be desired.

The reel is also provided with a ratchet 50 which is pivotally mounted on a plate 51 by a pin 52, and the plate 51 is pivotally mounted on a pin 53 and held by a screw 54 in a slot 55. A spring 56 is also provided which is held in a slot in the screw 53 and positioned to bear against the base 57 of the ratchet 50, and it will be noted that as the gear 13 rotates in one direction one corner of the base 57 will bear against the spring 56, and as it rotates in the opposite direction the opposite corner will bear against the spring 56, and as one corner is located a greater distance from the pin 53 where the spring 56 is held, a smaller amount of tension will be applied to the pin when the gear is rotating in a clockwise direction than when it is rotating in a counterclockwise direction. This will make it possible to provide greater tension on the reel when the line is playing out, and at the same time make it possible to wind the line in with a relatively small tension thereon. The reel is also provided with a bail or yoke 58 which is attached to both of the sides 2 and 3 to support the upper ends thereof. This member is provided with flanges 59 and 60 which may be attached as shown in Figures 1 and 2. It will be understood, however, that any other means may be provided for holding the upper portions of the sides.

It will be understood that other changes may be made in the construction without departing from the spirit of the invention. One of which changes may be in the use of an extension of any other type or design at the side of the reel through which the line may pass, another may be in the use of a brake or ratchet of any other type or design in combination with a reel having an extension, and still another may be in the use of an extension at the side of a reel in combination with a spool or reel of any other type or design.

Figure 6:
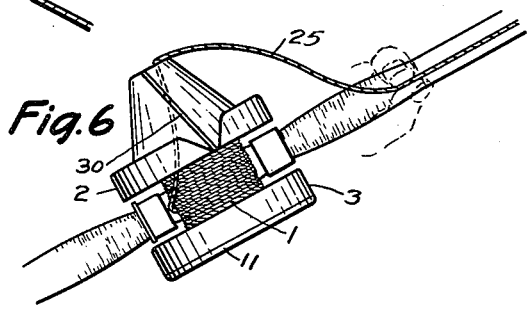
Figure 6 is a plan view showing the reel on the rod with the hand in the position of holding the line.
Figure 7:
Figure 7 is a similar view showing the line held between the thumb and rod.

The construction will readily be understood from the foregoing description. In use the reel may be supplied as shown and described, and may be attached to the handle of a fishing rod, as shown in Figure 6 and ordinarily the reel may be used in the usual manner, however when it is used for casting the rod may be held in the right hand and the line may be gripped by the thumb and forefinger of the left hand and readily threaded through the slot 30 by starting at the point 29 and passing the line downward through the slot and into the opening 27. The line may then be taken over and placed between the thumb and forefinger of the right hand, as shown in Figure 6, or may be gripped under the thumb of the right hand as shown in Figure 7, and when casting the rod may be drawn backward and as it is drawn forward the line may be released by the right hand and when the cast is made it will be absolutely free to draw off of the end of the reel so that a cast of considerable distance may be made. It will be noted that in any other type of reel, except those in which the spool turns at right angles to the rod, it is necessary for the spool to turn and unwind, whereas in this device the spool remains in its position upon the rod, and the line passes off of the end thereof very freely so that it is not necessary to overcome the friction of unwinding the spool. It will also be noted that as the line passes outward it will be thrown outward forming a loop, as shown in Figure 3, instead of being drawn directly off of the spool, thereby bearing against the inner surface of the conical shaped section 2 instead of rubbing against the flange of the spool. The motion of drawing the line off of the spool in this manner and throwing the line away from the spool and conical shaped section holds it back as shown, and then when the cast is made the line may readily be taken between the thumb and forefinger of the left hand and brought back through the slot 30, and as the slot 30 starts at the edge of the opening 27, it may readily be drawn out of the opening and passed back to the spool of the reel. The line may, therefore, be readily threaded through the conical shaped side of the reel, and as readily removed therefrom.

Having thus fully described the invention, what I claim as new and desire to secure by Letters Patent, is:

1. A reel having a fixed extension permanently positioned at one side through which a fishing line may be threaded, holding the line at a point substantially in the longitudinal axis of the reel for drawing the line off of one end of the reel spool, in which the extension is in the form of a conical shaped member, having a slot in the upper surface thereof through which the line may be placed or removed.

2. A reel as described in claim 1 in which the slot extends from the spool of the reel to the outer end thereof.

3. A reel as described in claim 1 in which the slot extends from the spool of the reel to the outer end thereof, and in which said slot starts from a point ahead of the center of the spool and slopes slightly backward to a point in the outer end thereof which is behind the longitudinal center of the spool.

4. A reel as described in claim 1 having an opening in the outer end in which the slot extends into the opening at a point tangent to the rear edge thereof.

5. A reel as described in claim 1 having a line holding opening in the outer end in which the slot extends into the opening at a point tangent with the rear side thereof, and in which an eyelet is provided in said opening.

6. A reel as described in claim 1 having a line holding opening in the outer end in which the slot extends into the opening at a point tangent with the rear side thereof, and in which means is provided for braking the spool of said reel.

7. A reel as described in claim 1 having an opening in the outer end in which the slot extends into the opening at a point tangent with the rear side thereof, and in which a ratchet is provided for holding the spool of said reel by tension.

8. In combination, a fishing reel of the type in which the axis of the reel spool is fixedly mounted perpendicular to a rod upon which it is used, and a special stationary side plate positioned against one end of the reel spool having an extending member permanently positioned at one side thereof through which the line may be drawn off of the end of the reel spool as the line passes out and from which the line may be removed so that it may pass off the reel spool in the usual manner when desired.

9. A reel as described in claim 8 having means through which the line may readily be threaded through the special member and removed therefrom.

10. A reel as described in claim 8 in which the said special member has an opening in the outer end thereof substantially in line with the longitudinal axis of the reel spool through which the line passes.

11. A reel as described in claim 8 in which the said special member has an opening in the outer end thereof substantially in line with the longitudinal axis of the reel spool through which the line passes, and in which the upper surface thereof is provided with a slot communicating with the said opening and the space in which the spool is located, through which the line is threaded.

12. A fishing reel comprising a spool, a side plate having an extension upon which the spool is rotatably mounted, a base, and a cone forming a complementary side on the opposite side of the spool, said cone having a line holding opening in the outer end and a slot in the upper surface thereof through which the line from the spool may be fed to the opening in the outer end of the cone.

13. A reel as described in claim 12 in which the slot slopes forward from the rear side of the opening in the outer end of the cone.

14. A reel as described in claim 1 having a suitable brake incorporated therein.

15. A reel as described in claim 1 having a ratchet incorporated therein for providing a clicking mechanism to operate as the spool turns.

JOHN M. MILLER.